United States Patent [19]

Wilmers et al.

[11] 3,814,556
[45] June 4, 1974

[54] OIL SEAL CONSTRUCTION FOR ROTARY ENGINES

[76] Inventors: Gottlieb Wilmers, Friedhofstrasse 25, Neuenstadt; Hermann Hillinger, Nurnberger Strasse 35, Heilbronn, both of Germany

[22] Filed: Mar. 9, 1973

[21] Appl. No.: 339,962

[30] Foreign Application Priority Data
Mar. 25, 1972   Germany............................ 7211511

[52] U.S. Cl................................. 418/142, 267/181
[51] Int. Cl. ............................................ F01c 19/08
[58] Field of Search ............ 418/142, 144; 267/158, 267/161, 181

[56] References Cited
UNITED STATES PATENTS 3,180,563   4/1965   Jones et al...................... 418/142 X
3,506,275   4/1970   Moriyama...................... 418/142 X Primary Examiner—C. J. Husar
Assistant Examiner—Leonard Smith
Attorney, Agent, or Firm—Kane, Dalsimer, Kane, Sullivan and Kurucz

[57] ABSTRACT

An oil seal construction for rotary engines includes an oil scraper ring disposed in an oil seal groove of the rotor. The ring extends into sealing contact with adjacent surfaces of the rotor housing wall. An annular Belleville type spring is disposed in the groove for urging the ring against the wall. This spring possesses openings for decreasing stiffness with a cover of elastic material covering the opening while extending over surfaces of the spring abutting the grooved surfaces and scraper ring.

3 Claims, 5 Drawing Figures

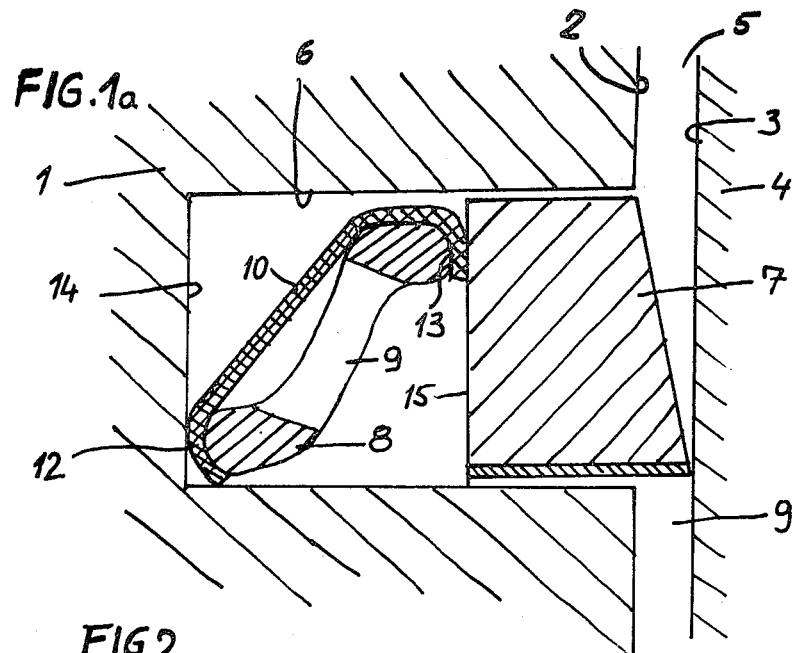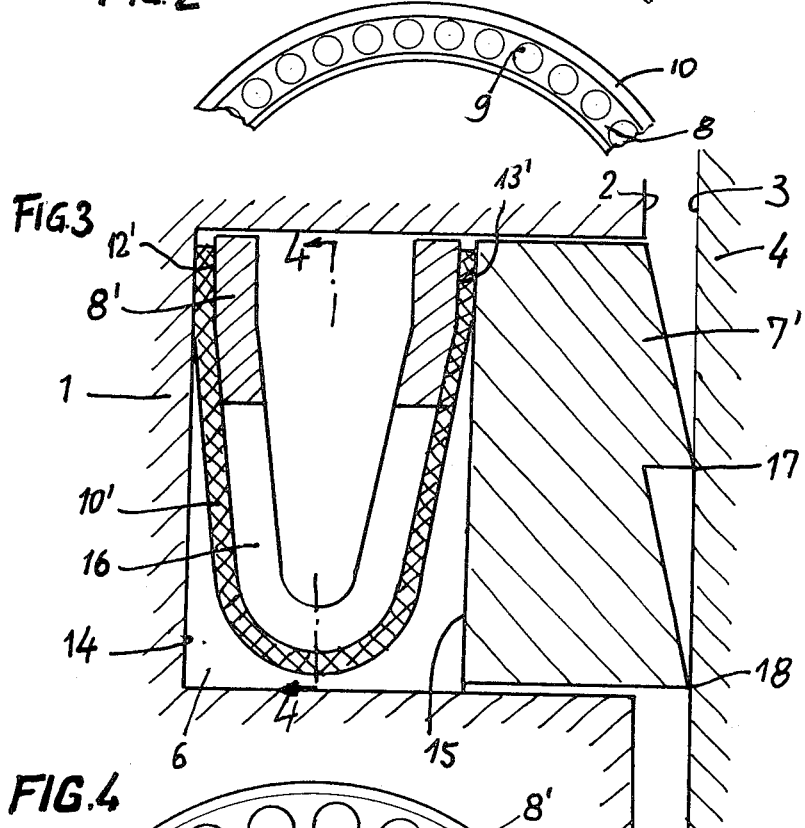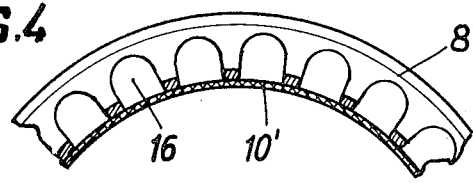

OIL SEAL CONSTRUCTION FOR ROTARY ENGINES

BACKGROUND OF THE INVENTION

This invention relates to oil seal constructions for rotary engines, preferably rotary combustion engines of the Wankel type. It should be understood, however, that although the invention is preferably described as embodied in a rotary combustion engine, it is not intended that the invention be so limited.

In rotary combustion engines the oil seal comprises a scraper ring which is arranged in an annular groove in an end face of the rotor and is urged by a spring against the adjacent end wall of the housing.

In a known oil seal device the spring that urges the scraper ring against the housing end wall is in the shape of a Belleville spring which has ground abutment surfaces for sealing contact on a wall of the groove and on the scraper ring, respectively. Under the influence of varying temperatures and accelerations caused by the planetary revolving movement of the rotor such Belleville springs are distorted with the result that they do not sealingly engage the wall of the groove and/or the scraper ring. This drawback can be met by providing a plastic coating on the abutting surfaces of the Belleville spring. This however, does not remove a further drawback of the known Belleville spring, namely the fact that they exert considerable axial forces with the result that the scraper ring is pressed against the end wall of the housing with a greater force than necessary for obtaining sufficient sealing, thereby causing excessive wear.

It is an object of this invention to provide a novel and improved oil seal construction for rotary engines or the like.

It is another object of the invention to provide an oil seal construction, having a Belleville type spring, that sealingly engages both a wall of the groove and the scraper ring and which does not cause excessive wear of the scraper ring or of the end wall of the housing against which the scraper ring is urged by this spring.

SUMMARY OF THE INVENTION

According to the invention, the Belleville type spring is provided with openings for decreasing its stiffness which openings are covered by a cover consisting of an elastic material which cover extends over the surfaces of the spring abutting the wall of the groove and the scraper ring.

The invention, therefore, provides a Belleville type spring, the spring rate of which can be adapted to the demands with small radial dimensions and without decreasing its ruggedness, whereby the cover maintains the function of the Belleville type spring as a sealing element between the scraper ring and the rotor. Whereby the usual elastomer ring between the scraper ring and the radial inner or outer wall of the groove can be dispensed with, so that the axial mobility of the scraper ring is increased and a Belleville type spring having a relatively low spring rate is sufficient for ensuring a continuous sealing engagement between the scraper ring and the adjacent end wall of the housing.

The Belleville type spring can be single or double that means V-shaped in cross-section.

The invention will be more fully understood from the following detailed description thereof, when considered in connection with the accompanying drawings, wherein several embodiments of the invention are illustrated by way of example and in which:

BRIEF DESCRIPTION OF THE DRAWING

FIG. 1a is an enlarged, fragmentary cross-sectional view of the oil seal construction shown in FIG. 1;

FIG. 2 is a fragmentary plan view of the Belleville type spring of FIG. 1a as viewed from the right;

FIG. 3 is a fragmentary cross-sectional view similar to FIG. 1a, showing another embodiment of the invention; and FIG. 4 is a partial sectional view along line 4—4 in FIG. 3.

DESCRIPTION OF THE PREFERRED EMBODIMENTS

Figure 1:
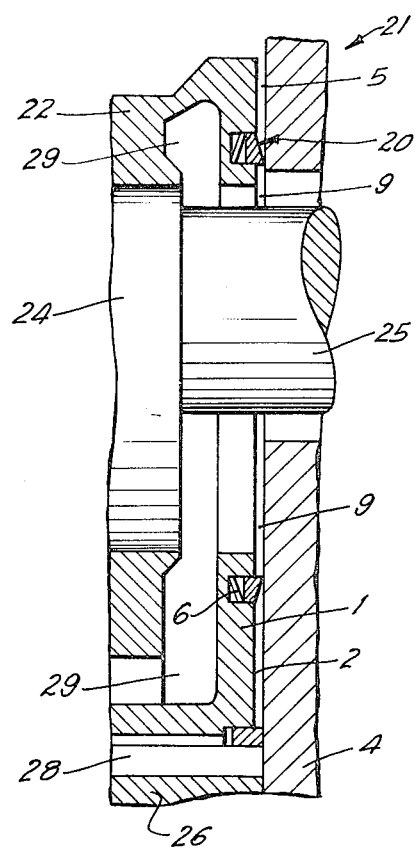
FIG. 1 is a fragmentary cross-sectional view of a rotary engine having an oil seal construction according to a first embodiment of the invention.

Now referring particularly to FIG. 1, the reference number 20 generally designates the oil seal construction according to one embodiment of this invention which construction is disposed in a rotary engine 21 of the type such as disclosed in U. S. Pat. No. 2,988,065.

The rotary engine 21 comprises a rotor 22 which is mounted on the excentric portion 24 of the crankshaft 25 for rotation within a housing, consisting of a peripheral wall 26 and two opposite end walls 4, only one of which is shown. The surface 28 of peripheral wall 26 may have in cross-section, a double-epitrochoidal shape so that, with rotor 22 of three-lobed configuration, a plurality of working chambers, not shown are formed, which successively expand and contract in size as the rotor rotates. To prevent liquid leakage, such as lubricating and/or cooling oil, from flowing from the interior 29 of rotor 22 and from the area 9 adjacent crankshaft 24 through space 5 into the working chambers, the oil seal construction 20, according to this invention, is disposed in an annular groove 6 in the end face 2 of the rotor end wall 1.

As best shown in FIG. 1a, the oil seal construction 20 comprises a scraper ring 7 arranged for axial movement in annular groove 6 and urged against the adjacent end face 3 of end wall 4 by a Belleville type spring 8.

In order to decrease the stiffness or spring rate of the Belleville type spring 8 it is provided with openings 9 which are arranged in a number and size necessary to obtain the desired axial biasing force for the scraper ring 7. These openings 9 are covered by a cover 10 made of an elastic material which cover 10 extends around the edges 12 and 13 of the Belleville spring 8, where the spring 8 engages the wall 14 of groove 6 and the backside 15 of scraper ring 7. The cover 10, therefore, forms an efficient seal between the scraper ring 7 and the wall 14 and prevents the escape of cooling or lubricating liquid from the space 9 through groove 6 into space 5. On the other hand, the cover 10 prevents escape of working gases from the space 5 via groove 6 into space 9.

The cover 10 consists preferably of polytetrafluorethylene and it can be attached to Belleville type spring 8 for instance by glueing.

FIGS. 3 and 4 show an oil seal construction which differs from the construction shown in FIGS. 1, 1a and 2 essentially only in that the Belleville type spring 8' is formed as a double spring, having a V-shaped cross section. For obtaining the desired spring rate this spring 8' is provided with incisions 16 at its inner periphery. The double spring 8' is again provided with a cover 10' consisting of elastic material which cover 10', covers the incisions 16 and again extends over the surfaces 12' and 13', where the spring 8' engages the wall 14 of groove 6 and the backside 15 of scraper ring 7'. In this case, the scraper ring 7' is provided with two scraper edges 17 and 18.

What we claim is:

1. An oil seal construction for sealing between an outer body and a rotor movable relative to said outer body; said oil seal construction comprising an oil seal groove, disposed in an end wall of said rotor and coaxial therewith, an oil scraper ring disposed in said oil seal groove with said scraper ring being in sealing contact with an adjacent outer body wall, an annular Belleville type spring means for said oil scraper ring, said spring means being disposed in said oil seal groove for providing an axially directed spring force component against the scraper ring in the direction of the adjacent outer body wall, said spring having openings or incisions for decreasing its stiffness, a cover of elastic material covering said openings or incisions, said cover extending over those surfaces of the spring where the spring abuts a wall of said groove and the scraper ring.

2. An oil seal construction according to claim 1 wherein said Belleville type spring is of V-shaped cross-section.

3. An oil seal construction according to claim 1, wherein said cover consists of polytetrfluorethylene.

* * * * *

UNITED STATES PATENT OFFICE
CERTIFICATE OF CORRECTION

Patent No. 3,814,556　　　　　　　　Dated June 4, 1974

Inventor(s) Gottlieb Wilmers and Hermann Hillinger

It is certified that error appears in the above-identified patent and that said Letters Patent are hereby corrected as shown below:

The name of the assignee was omitted, please insert

-- Audi NSU Auto Union Aktiengesellschaft
Neckarsulm/Wurttemberg, Germany and
Wankel GmbH, Lindau/Bodensee, Germany --.

Signed and sealed this 3rd day of December 1974.

(SEAL)
Attest:

McCOY M. GIBSON JR.　　　　　　　C. MARSHALL DANN
Attesting Officer　　　　　　　　Commissioner of Patents